UNITED STATES PATENT OFFICE.

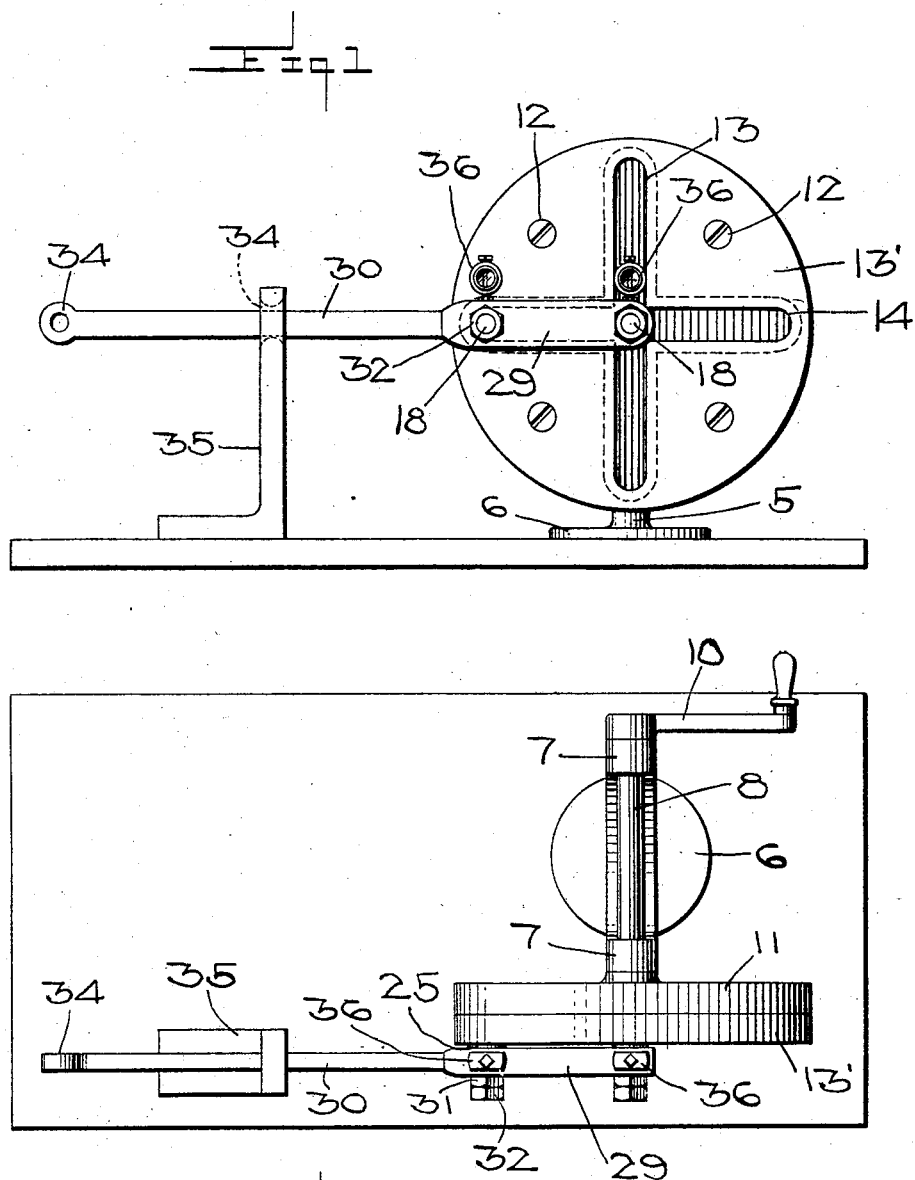

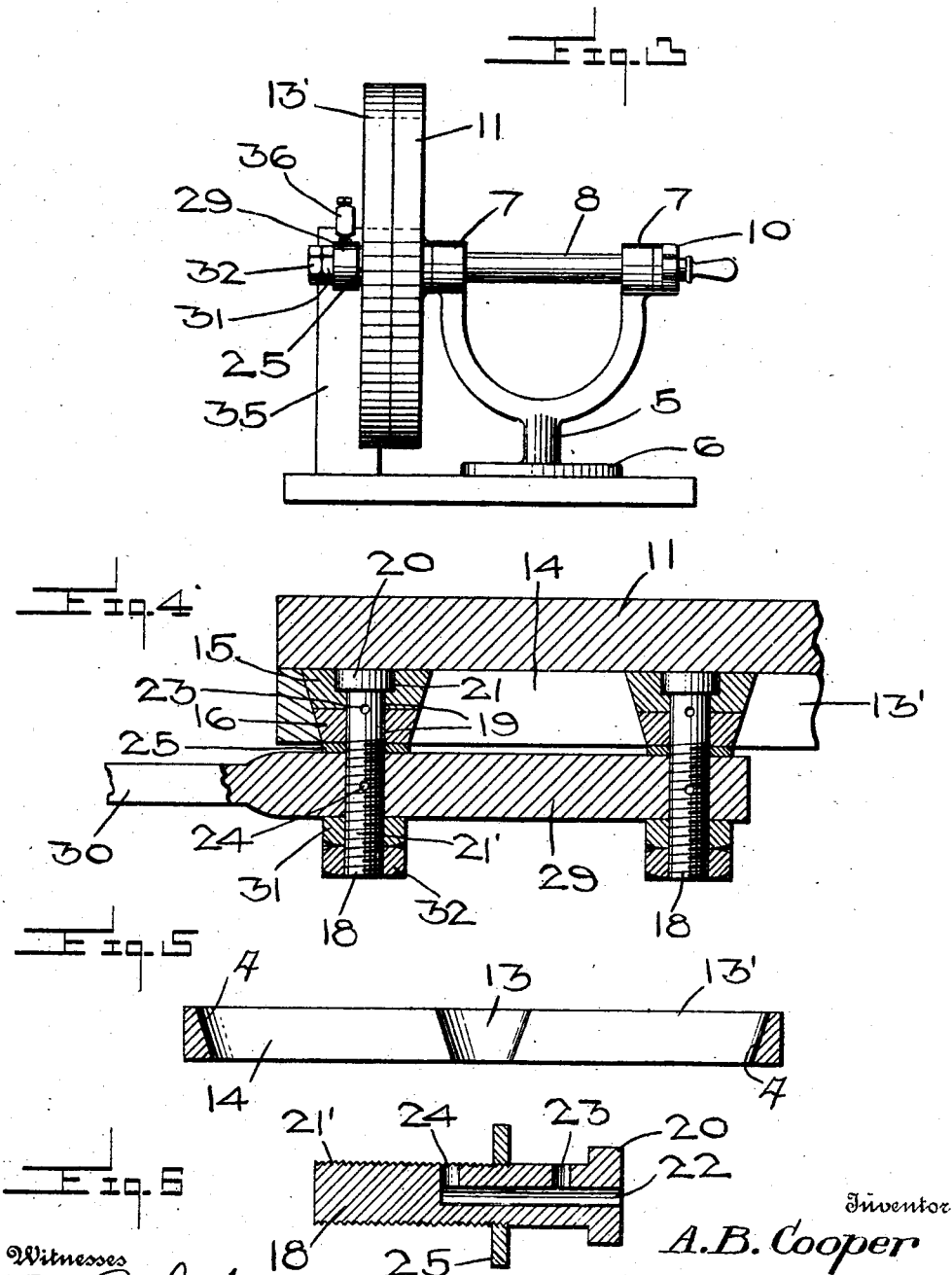

ANDREW B. COOPER, OF OKOEE, OKLAHOMA.

TRAMMEL.

969,156.   Specification of Letters Patent.   Patented Sept. 6, 1910.

Application filed October 22, 1909. Serial No. 524,068.

*To all whom it may concern:*

Be it known that I, ANDREW B. COOPER, a citizen of the United States, residing at Okoee, in the county of Craig and State of Oklahoma, have invented certain new and useful Improvements in Trammels, of which the following is a specification.

This invention has relation to certain new and useful improvements in devices for converting motion.

The object of my invention is to provide a pitman operating mechanism, so constructed that the pitman will twice reciprocate upon each revolution of the connected driving wheel.

A further object is to provide a lubricating means whereby the wipers, as used in my invention, may be kept in a lubricated condition.

With these and other objects in view the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like numerals of reference indicate similar parts in the several views, Figure 1 is an elevational view of my device. Fig. 2 is a top view. Fig. 3 is an end view. Fig. 4 is an enlarged detached fragmentary view of the wipers. Fig. 5 is a sectional view through the face plate. Fig. 6 is a detail sectional view of one of the bearing pins with a collar applied thereto.

The aim of my invention is to provide a readily operated mechanism for converting a rotary motion into a reciprocating motion, and in carrying out the object of my invention, I employ a standard 5 having the securing base 6, and from which standard extend the two similar bearing arms 7.

Held within the bearing arms 7, is the horizontally disposed drive shaft 8 provided at one end with the operating crank 10, and at the opposite end with the carrier disk 11.

Secured to the carrier disk 11 by means of the bolts 12, is the face plate 13′, having two slots 13 and 14 of equal length and crossing each other midlength at right angles as disclosed in Fig. 1. These slots are in the form of splayed openings, the opposite walls converging from the base toward the outer edges as shown in Fig. 5.

Slidably held within the splayed slots, are the frusto-conical wipers 15 and 16 these wipers being revolubly held upon the pins 18, two such pins being used. As shown in Fig. 4 the wiper 16 forms a continuation of the wiper 15. Both wipers are provided with a centrally disposed opening 19 serving as a bearing to receive the smooth bearing portion of the supporting pins 18. As shown in Fig. 6, each pin has an enlarged head 20 held within a seat 21 formed in the outer face of the wiper 15.

Each pin 18 has its end 21′ opposite the head 20 threaded while entering the pins from the headed end, is a bore 22 forming an oil channel having the two lateral outlets 23 and 24.

The wipers 15 and 16 are held between the head 20 and a threaded collar 25 adjustably secured to the pin and these pins are arranged to be held within the head 29 of the pitman 30. The pitman head 29 is held between the stop collars 25 and the nuts 31 a second nut 32 being employed as a lock nut. The pitman at its end is provided with the bearing eye 34 arranged to receive the coupling or other rod connected to the machine or device to be operated. The pitman 30 is held within the opening 34 of the stand 35 employed to guide the pitman.

Secured to the pitman head 29 in alinement with the openings 24 within the hollow pins, are the ends of the oil cups 36, so that the oil or other lubricant will drain through the lateral branches 24 down the channel 22 and out of the lateral branch or outlet 23, so that the oil will escape between the two wipers to lubricate these as well as the splayed channels within which they work.

From the foregoing it will be seen that the wipers are thoroughly lubricated, and that the face plate can at all times be readily removed in order that the wiper channels may be cleaned. The ends 4 of the channels also incline toward one another from the bottom of the channel as shown in Fig. 5. The form of this channel aids in holding the lubricant within the same.

The device is simple of construction and positive of operation, and the pitman may be readily connected to or removed from the operating head.

What is claimed is:

1. The combination with a supporting standard, of a drive shaft, a disk carried by said shaft, a face plate having two splayed slots of equal length crossing each other at right angles, a pitman, two pins extending from said pitman each having an enlarged head and a central bore with two lateral outlets, two frusto-conical wiper rollers held upon each pin and reciprocating within said slots, one of said lateral outlets emptying between said rollers, a collar carried upon each pin, nuts upon each pin to clamp said pitman head against said collars, and oil cups carried by said pitman and communicating with said remaining lateral outlet.

2. The combination with a supporting standard, of a drive shaft, a disk carried by said shaft, a face plate detachably secured to said disk and having two splayed slots crossing each other at right angles and terminating short of the peripheral edge of the face plate, a pitman, two pins detachably secured to said pitman, each of said pins having an enlarged head, frusto-conical wiper rollers rotatably journaled on said pins and retained in position over said enlarged heads, said pins also having a central bore communicating with said rollers and oil cups carried by said pitman and having connection with said bores.

In testimony whereof I affix my signature, in presence of two witnesses.

ANDREW B. COOPER.

Witnesses:
PERRY S. LAWRIMORE,
MELVIN HUGGINS.